United States Patent
Huang et al.

(10) Patent No.: US 7,325,742 B2
(45) Date of Patent: Feb. 5, 2008

(54) PORTABLE DATA PROCESSING DEVICE CAPABLE OF ACQUIRING IMAGES AND SUPPORTING HUMAN HANDS

(75) Inventors: Ying-Hui Huang, Taipei (TW);
Bo-Hsiang Wang, Taiping (TW);
Te-Chuan Hsieh, Kaohsiung (TW);
Yung-Chuan Wu, Pingzhen (TW)

(73) Assignee: Avision Inc. (TW)

( * ) Notice: Subject to any disclaimer, the term of this patent is extended or adjusted under 35 U.S.C. 154(b) by 239 days.

(21) Appl. No.: 11/208,643

(22) Filed: Aug. 23, 2005
(Under 37 CFR 1.47)

(65) Prior Publication Data
US 2006/0038018 A1     Feb. 23, 2006

(30) Foreign Application Priority Data
Aug. 23, 2004   (TW) ............................... 93125306 A

(51) Int. Cl.
*G06K 7/10* (2006.01)

(52) U.S. Cl. .............................. 235/472.01; 235/462.01

(58) Field of Classification Search ................
235/462.01–462.25, 472.01, 472.02, 472.03,
235/437, 432; 358/474, 498, 473, 468, 1.15,
358/497, 488; 364/683, 679, 686
See application file for complete search history.

(56) References Cited

U.S. PATENT DOCUMENTS

| | | | | |
|---|---|---|---|---|
| 4,587,411 A * | 5/1986 | Obstfelder et al. | .......... | 235/437 |
| 5,115,374 A | 5/1992 | Hongoh | | |
| 5,949,643 A * | 9/1999 | Batio | .......... | 361/681 |
| 6,011,634 A * | 1/2000 | Aihara et al. | ............... | 358/468 |
| 6,081,207 A * | 6/2000 | Batio | .......... | 341/20 |
| 6,597,568 B2 * | 7/2003 | Ryder | .......... | 361/683 |
| 6,646,768 B1 * | 11/2003 | Andersen et al. | .......... | 358/474 |
| 6,704,124 B2 * | 3/2004 | Hu et al. | .......... | 358/473 |
| 6,753,982 B1 * | 6/2004 | Sheng et al. | ............... | 358/474 |
| 2004/0070798 A1 * | 4/2004 | Andersen et al. | .......... | 358/498 |
| 2006/0209333 A1 * | 9/2006 | Takida | .......... | 358/1.15 |

FOREIGN PATENT DOCUMENTS

TW           547694 Y        8/2003

* cited by examiner

*Primary Examiner*—Thien Minh Le

(57) ABSTRACT

A portable data processing device capable of acquiring images and supporting human hands includes a portable data processing module and a portable image acquiring module. The portable image acquiring module for scanning a document is mounted on a side surface of a base of the portable data processing module in order to support the human hands and make an operation interface, which is installed on the base, be easily operated.

21 Claims, 4 Drawing Sheets

PORTABLE DATA PROCESSING DEVICE CAPABLE OF ACQUIRING IMAGES AND SUPPORTING HUMAN HANDS

BACKGROUND OF THE INVENTION

1. Field of the Invention

The invention relates to a portable data processing device capable of acquiring images and supporting human hands, and more particularly to a portable data processing device combining a portable data processing module with a portable image acquiring module.

2. Description of the Related Art

Portable data processing devices, such as a notebook computer and a portable tablet computer, are widely used by modern human beings, and the consumers require more and more functions on the devices. If the user wants to utilize the portable data processing device to scan a document and then store, mail, or fax the scanned electric file, an external image scanner usually has to be provided.

U.S. Pat. No. 5,115,374 discloses a portable computer having a sheet-fed scanning device disposed in a housing of a display. In the '374 patent, the sheet-feeding mechanism disposed in the housing of the display transports a document along a sheet passageway having a length greater than the length of the housing of the display. Thus, the scanning device occupies a relative large space in the housing of the display, which does not satisfy the requirement of the miniaturized product. In addition, when the scanning device of the '374 patent is scanning a document, the user has to close the display, and then open the display after the scanning process ends. Thus, the operation flow is quite inconvenient. Furthermore, when a paper jam occurs, the user cannot clear the pager jam easily because the length of the sheet passageway and thus the length of the sheet in the sheet passageway are very long.

Taiwan Patent Publication No. 547694 discloses a notebook computer having a scanning unit, which is disposed in a housing of a display of the notebook computer, and is thus similar to the sheet-fed scanning device as disclosed in the '374 patent. Thus, the provision of the scanning unit may reduce the size of the display or enlarge the size of the housing of the display. Because the user needs a larger display of the notebook computer, disposing the scan structure in the housing of the display is not a human-oriented method and cannot satisfy the requests of the modern human beings. In addition, when the sheet-fed scanning operation is being performed, the motor and the sheet-feeding mechanism tend to cause vibration. In addition, the housing of the display for fixing the motor and the sheet-feeding mechanism is only supported by way of pivotable connection, so the stable supporting effect cannot be achieved, thereby causing the display to vibrate during the sheet-fed scanning operation.

SUMMARY OF THE INVENTION

It is therefore an object of the invention to provide a portable data processing device capable of acquiring images and supporting human hands to provide the hands with a larger operation space.

To achieve the above-mentioned object, the invention provides a portable data processing device including a portable data processing module and a portable image acquiring module. The portable data processing module includes a base and a display. The base has an operation platform, on which a hand of a user may be placed, and an operation interface disposed on the operation platform. The operation platform has a first transversal edge, a second transversal edge, a first longitudinal edge and a second longitudinal edge. The display is pivotably connected to the base at the first transversal edge and has a display surface facing the operation platform when the display is closed onto the base. The portable image acquiring module for scanning a document is mounted on the base to support the hand of the user. A longest distance from the portable image acquiring module to the first transversal edge is substantially greater than or equal to a length of the first longitudinal edge. The portable image acquiring module includes an image sensing unit, a sheet-feeding mechanism for transporting the document, and a sheet passageway for guiding the document along a transporting path and across the image sensing unit such that the image sensing unit scans the document. The sheet passageway is configured such that the transporting path passes through an extension surface extending from the operation platform.

To achieve the above-identified object, the invention also provides a portable data processing module to be detachably mounted on and connected to a portable image acquiring module for scanning a document in order to support a hand of a user. Also, the invention further provides a portable image acquiring module to be detachably mounted on and connected to a base of a portable data processing module so as to supporting a hand of a user.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 1:
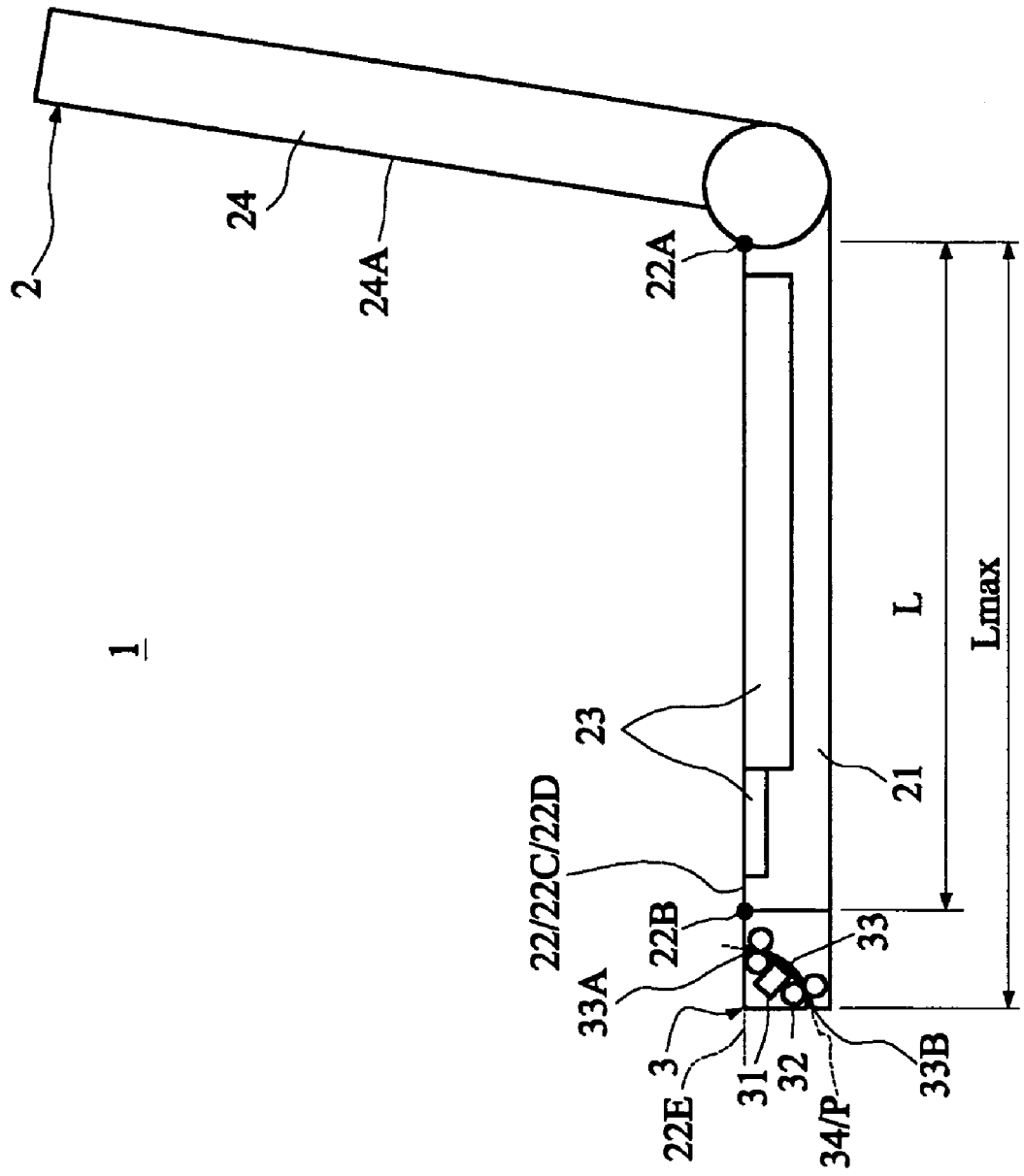
FIG. 1 is a schematic side view showing a portable data processing device according to a first embodiment of the invention.
Figure 2:
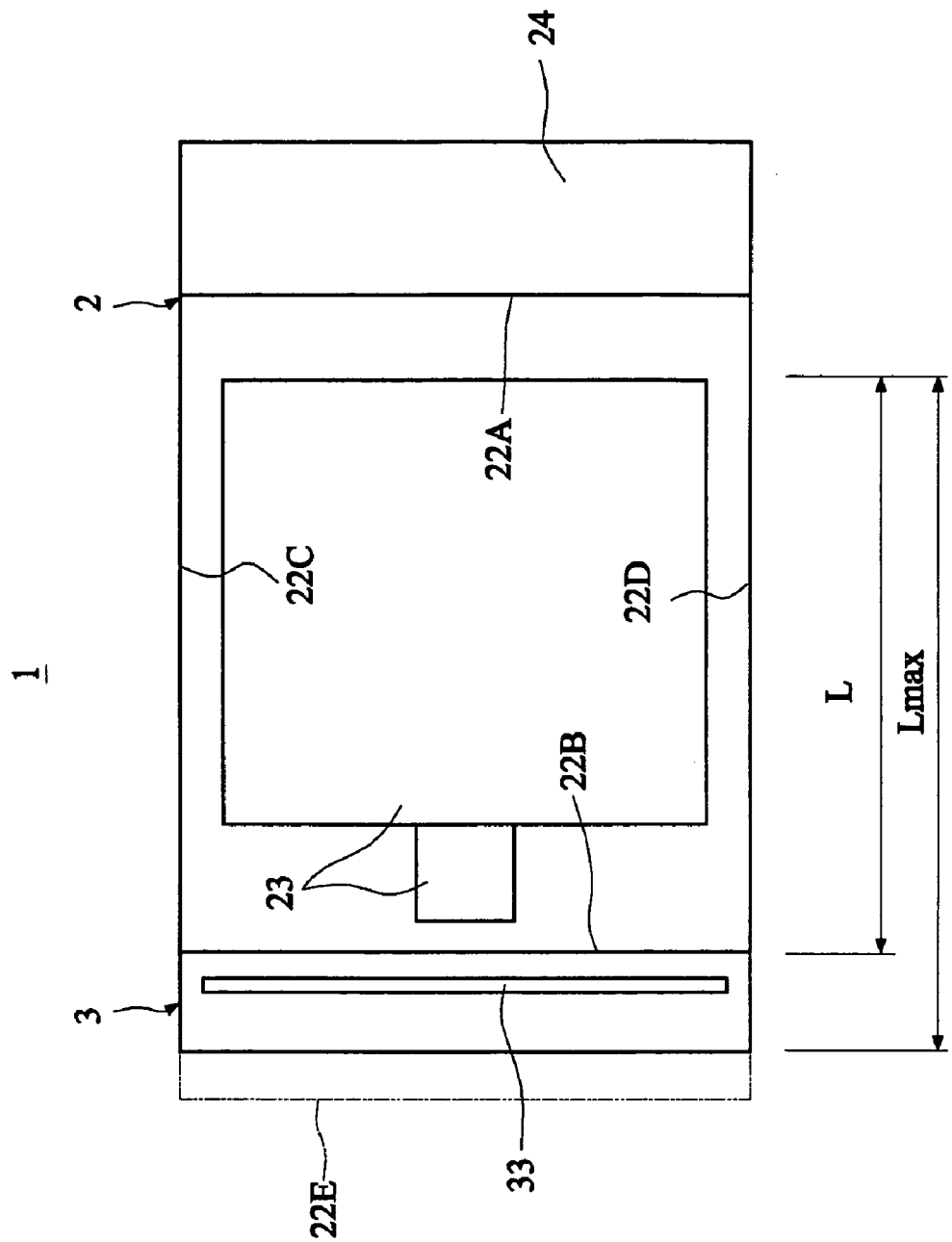
FIG. 2 is a schematic top view showing the device of FIG. 1.

FIGS. 1 and 2 are schematic side and top views respectively showing a portable data processing device according to a first embodiment of the invention. Referring to FIGS. 1 and 2, the portable data processing device 1 includes a portable data processing module 2 and a portable image acquiring module 3. The portable data processing module 2 may be a notebook computer or a tablet computer, and the portable image acquiring module 3 may be a scanning unit such as a sheet-fed document scanner or a sheet-fed business card scanner. The portable image acquiring module 3 is detachable from the portable data processing module 2 or is fixed to the portable data processing module 2.

The portable data processing module 2 includes a base 21 and a display 24. The base 21 has an operation platform 22 and an operation interface 23 disposed on the operation platform 22. The operation interface 23 may be a keyboard, a mouse, a track ball, or the like. When the user is operating the keyboard, the mouse or the track ball, his or her wrists need to be supported. The wrist supporting platform of the typical notebook computer is not sufficient to some users. If a surface extending from the platform to the user's side can be provided, the user feels comfortable in the operation procedure. In this embodiment, a hand or two hands of the user may be placed on the operation platform 22. The operation platform 22 has a first transversal edge 22A, a second transversal edge 22B, a first longitudinal edge 22C and a second longitudinal edge 22D. The display 24 is pivotably connected to the base 21 at the first transversal edge 22A and has a display surface 24A facing the operation platform 22 when the display 24 is closed onto the base 21. The portable image acquiring module 3 for scanning a document P is mounted on the base 21 to support the hand or hands of the user. A longest distance Lax from the portable image acquiring module 3 to the first transversal edge 22A is substantially greater than or equal to a length L of the first longitudinal edge 22C. In this embodiment, the portable image acquiring module 3 is disposed adjacent to the second transversal edge 22B in order to enlarge the area of the human hand supporting platform in the front of the user. However, the portable image acquiring module 3 may also be disposed adjacent to the first longitudinal edge 22C or the second longitudinal edge 22D such that the area of the human hand supporting platform in the left-hand side or the right-hand side of the user may be enlarged.

The portable image acquiring module 3 includes an image sensing unit 31, a sheet-feeding mechanism 32 for transporting the document P, and a sheet passageway 33. The image sensing unit 31 may be a contact image sensor (CIS) image sensing unit or a charge coupled device (CCD) image sensing unit. The CIS image sensing unit is preferred in the state of the art. The sheet passageway 33 guides the document P along a transporting path 34 and across the image sensing unit 31, such that the image sensing unit 31 scans the document. The sheet passageway 33 is configured such that the transporting path 34 passes through an extension surface 22E extending from the operation platform 22. In this embodiment, an outlet 33A of the sheet passageway 33 is disposed on the extension surface 22E. In other embodiments, however, an inlet 33B of the sheet passageway 33 may be disposed on the extension surface 22E. Alternatively, the outlet 33A may be lower or higher than the extension surface 22E.

The portable image acquiring module 3 can transmit an analog signal to the portable data processing module 2. In this case, the portable image acquiring module 3 does not need an analog-to-digital converter, a memory and a processor for processing and storing the analog signal, and the analog signal may be directly transmitted to the portable data processing module 2 for processing. Alternatively, the portable data processing module 2 may include an added analog-to-digital converter, an added memory and an added processor, or only include an added analog-to-digital converter in conjunction with the memory and the processor of the module 2 to finish the image processing work. As a result, the cost of the portable image acquiring module 3 may be effectively reduced, which is advantageous to the popularization of the product.

Alternatively, the portable image acquiring module 3 may also directly transmit a digital signal to the portable data processing module 2. In this case, the portable image acquiring module 3 has to include the analog-to-digital converter for processing the analog signal into a digital signal, while the memory and the processor for processing and storing the digital signal may be disposed in the portable data processing module 2 or the portable image acquiring module 3 according to the requirement.

In order to transmit the scanned image of the document directly, the portable data processing module 2 is preferably equipped with the software of "Scan to Fax" or "Scan to E-mail", such that the scanned image can be transmitted through the telephone line or the Internet.

In this embodiment, when the display 24 of the portable data processing module 2 is closed onto the base 21, the portable image acquiring module 3 is exposed to the outside. In other embodiments, however, the portable image acquiring module 3 may be covered by and located under the display 24 when the display 24 is closed onto the base 21, and the function of the invention is not influenced.

Figure 3:
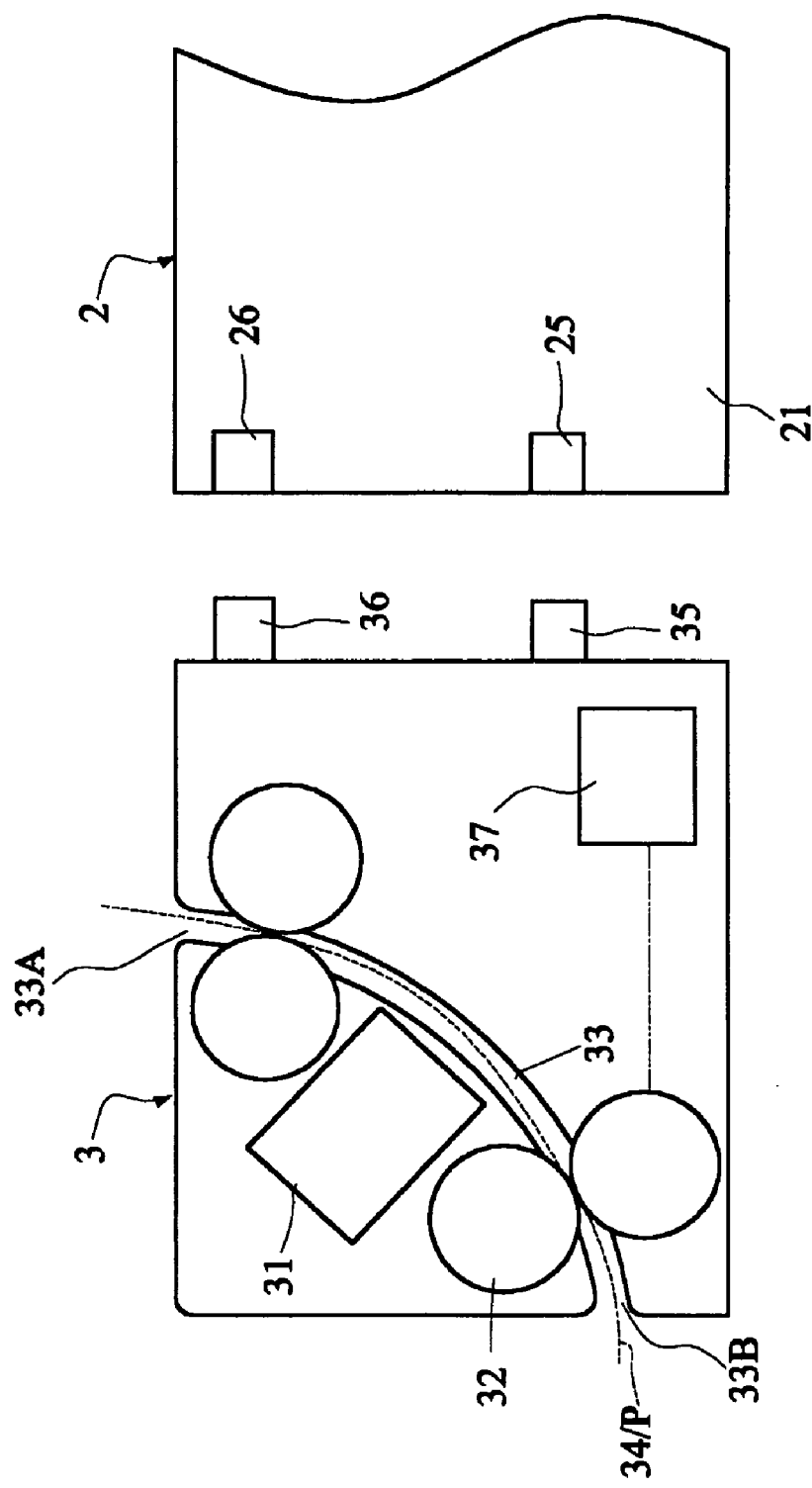
FIG. 3 is a schematically partially enlarged view showing the device of FIG. 1.

FIG. 3 is a schematically partially enlarged view showing the device of FIG. 1. As shown in FIG. 3, a set of engagement structures 25 and 35 engages the portable image acquiring module 3 to the portable data processing module 2, and a set of connection interfaces 26 and 36 electrically connects the portable image acquiring module 3 to the portable data processing module 2. Hence, the user can purchase the portable data processing module 2 and the portable image acquiring module 3 separately, and then combine the modules 2 and 3 together using the engagement structures and the connection interfaces to form the portable data processing device 1. In this embodiment, the portable image acquiring module 3 further includes a motor 37 for driving the sheet-feeding mechanism 32.

Figure 4:
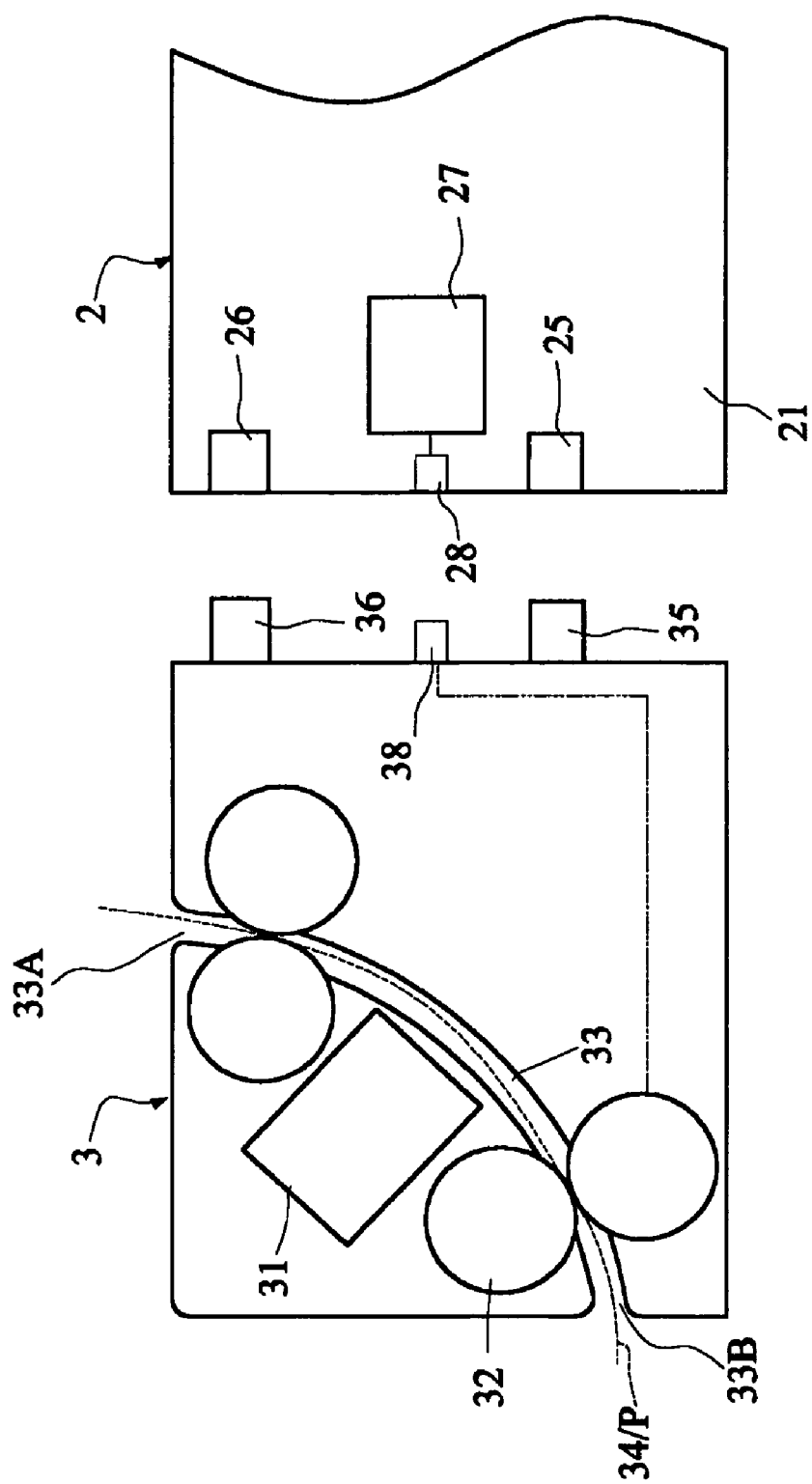
FIG. 4 is a partially enlarged side view showing a portable data processing device according to a second embodiment of the invention.

FIG. 4 is a partially enlarged side view showing a portable data processing device according to a second embodiment of the invention. In this embodiment, the portable data processing module 2 further includes a motor 27, which through a set of couplers 28 and 38, drives the sheet-feeding mechanism 32. In this case, the coupler 38 receives a power from the portable data processing module 2 to drive the sheet-feeding mechanism 32. According to such a design, the weight, the size and the cost of the portable image acquiring module 3 may be minimized.

In addition to the portable data processing device 1, the invention also provides a portable data processing module 2, which has an engagement structure and a connection interface, to be detachably mounted on and connected to a portable image acquiring module 3 in order to support a hand of a user. The invention also provides a portable image acquiring module 3, which has an engagement structure and a connection interface, to be detachably mounted on and connected to a portable data processing module 2 in order to support a hand of a user. Variations of the portable image acquiring module 3 and the portable data processing module 2 are described hereinabove, and detailed descriptions thereof will be omitted.

Consequently, the portable data processing device of the invention has not only the function of acquiring images but also the function of supporting human hands. Disposing a scanning unit on the portable computer at a front edge close to the user or at a side edge can provide the scan function without influencing the miniaturization of the portable computer in the state of the art. Furthermore, when the user is using the portable data processing device of the invention, it is more convenient because he or she does not have to close the display. Moreover, the user can operate the portable data processing device in a more comfortable way because the scanning unit can provide the additional hand supporting platform. Also, because the length of the sheet passageway of the scanning unit of the invention is shorter than that of the '374 patent, the paper jam may be easily cleared. The human-oriented function of supporting the human hands provided by the scanning unit of the invention cannot be found in the '694 patent. Thus, the invention indeed eliminates the prior art drawbacks to make the product more human-oriented.

While the invention has been described by way of examples and in terms of preferred embodiments, it is to be understood that the invention is not limited to the disclosed embodiments. To the contrary, it is intended to cover various modifications. Therefore, the scope of the appended claims should be accorded the broadest interpretation so as to encompass all such modifications.

What is claimed is:

1. A portable data processing device, comprising:
    a portable data processing module, which includes:
        a base having an operation platform, on which a hand of a user may be placed, and an operation interface disposed on the operation platform, wherein the operation platform has a first transversal edge, a second transversal edge, a first longitudinal edge and a second longitudinal edge; and
        a display pivotably connected to the base at the first transversal edge, wherein the display has a display surface facing the operation platform when the display is closed onto the base; and
    a portable image acquiring module, which is mounted on the base, for scanning a document and supporting the hand of the user, wherein a longest distance from the portable image acquiring module to the first transversal edge is substantially greater than or equal to a length of the first longitudinal edge, and the portable image acquiring module includes:
        an image sensing unit;
        a sheet-feeding mechanism for transporting the document; and
        a sheet passageway for guiding the document along a transporting path and across the image sensing unit, such that the image sensing unit scans the document, wherein the sheet passageway is configured such that the transporting path passes through an extension surface extending from the operation platform.

2. The device according to claim 1, wherein the portable image acquiring module is detachable from the portable data processing module or is fixed to the portable data processing module.

3. The device according to claim 1, wherein an inlet or an outlet of the sheet passageway is disposed on the extension surface.

4. The device according to claim 1, wherein the portable data processing module and the portable image acquiring module are engaged with each other with a set of engagement structures, and are electrically connected to each other through a set of connection interfaces.

5. The device according to claim 1, wherein the portable image acquiring module has a motor for driving the shoot-feeding mechanism.

6. The device according to claim 1, wherein the portable data processing module has a motor which, through a set of couplers, drives the sheet-feeding mechanism.

7. The device according to claim 1, wherein the portable image acquiring module transmits an analog signal to the portable data processing module.

8. The device according to claim 1, wherein portable image acquiring module transmits a digital signal to the portable data processing module.

9. The device according to claim 1, wherein the portable data processing module is a notebook computer or a tablet computer.

10. The device according to claim 1, wherein the portable image acquiring module is a sheet-fed document scanner or a sheet-fed business card scanner.

11. The device according to claim 1, wherein the portable image acquiring module is disposed adjacent to the second transversal edge, the first longitudinal edge or the second longitudinal edge.

12. A portable data processing module detachably mounted on and connected to a portable image acquiring module to support a hand of a user, the portable image acquiring module having an image sensing unit, a sheet-feeding mechanism for transporting a document, and a sheet passageway for guiding the document along a transporting path and across the image sensing unit, such that the image sensing unit scans the document, the portable data processing module comprising:
    a base having an operation platform, on which the hand of the user may be placed, and an operation interface disposed on the operation platform, wherein the operation platform has a first transversal edge, a second transversal edge, a first longitudinal edge and a second longitudinal edge, and the base has in engagement structure to be engaged with the portable image acquiring module, and a connection interface to be electrically connected to the portable image acquiring module; and
    a display pivotably connected to the base at the first transversal edge and having a display surface facing the operation platform when the display is closed onto the base, wherein when the portable image acquiring module is mounted on the base, a longest distance from the portable image acquiring module to the first transversal edge is substantially greater than or equal to a length of the first longitudinal edge, and the transporting path passes through an extension surface extending from the operation platform.

13. The module according to claim 12, wherein an inlet or an outlet of the sheet passageway is disposed on the extension surface.

14. The module according to claim 12, further comprising a motor which, through a set of couplers, drives the sheet-feeding mechanism.

15. The module according to claim 12, wherein the portable data processing module receives an analog signal from the portable image acquiring module.

16. The module according to claim 15, further comprising an analog-to-digital converter for processing the analog signal into a digital signal.

17. The module according to claim 16, further comprising a processor and a memory for processing and storing the analog signal or the digital signal.

18. The module according to claim 12, wherein the portable data processing module receives a digital signal from the portable image acquiring module.

19. The module according to claim 18, further comprising a processor and a memory for processing and storing the digital signal or an analog signal.

20. The module according to claim 12 being a notebook computer or a tablet computer.

21. The module according to claim 12, wherein the portable image acquiring module is disposed adjacent to the second transversal edge, the first longitudinal edge or the second longitudinal edge.

* * * * *